(12) United States Patent
Victoroff et al.

(10) Patent No.: US 11,194,953 B1
(45) Date of Patent: Dec. 7, 2021

(54) GRAPHICAL USER INTERFACE SYSTEMS FOR GENERATING HIERARCHICAL DATA EXTRACTION TRAINING DATASET

(71) Applicant: INDICO, Boston, MA (US)

(72) Inventors: Slater Victoroff, Somerville, MA (US); Madison May, Melrose, MA (US); Michael Langlie, Spencer, MA (US); Lily Zhang, Allston, MA (US); Benjamin Townsend, Plymouth (GB); Kevin Fan, Boston, MA (US); Jacob Klingensmith, Somerville, MA (US)

(73) Assignee: INDICO, Boston, MA (US)

( * ) Notice: Subject to any disclaimer, the term of this patent is extended or adjusted under 35 U.S.C. 154(b) by 0 days.

(21) Appl. No.: 16/862,386

(22) Filed: Apr. 29, 2020

(51) Int. Cl.
  *G06F 40/106* (2020.01)
  *G06F 3/0481* (2013.01)

(52) U.S. Cl.
  CPC .......... *G06F 40/106* (2020.01); *G06F 3/0481* (2013.01)

(58) Field of Classification Search
  CPC .............................. G06F 3/0481; G06F 40/106
  See application file for complete search history.

(56) References Cited

U.S. PATENT DOCUMENTS

| | | | | |
|---|---|---|---|---|
| 5,574,802 A * | 11/1996 | Ozaki | ................ | G06K 9/00463 358/462 |
| 6,298,357 B1 * | 10/2001 | Wexler | .................. | G06F 40/221 715/210 |
| 6,687,404 B1 * | 2/2004 | Hull | .................... | G06K 9/00442 382/180 |
| 7,613,995 B2 * | 11/2009 | Wen | ........................ | G06F 40/14 715/209 |
| 8,365,072 B2 * | 1/2013 | Mansfield | ............. | G06F 40/174 715/273 |
| 10,152,648 B2 * | 12/2018 | Filimonova | .......... | G06K 9/6262 |
| 2004/0006742 A1 * | 1/2004 | Slocombe | ............. | G06F 40/205 715/234 |
| 2005/0076295 A1 * | 4/2005 | Simske | ............. | G06K 9/00442 715/243 |

(Continued)

OTHER PUBLICATIONS

"VIPS: a Vision-based Page Segmentation Algorithm," Cai et al., Microsoft Research, Nov. 1, 2003 (30 pages) (Year: 2003).*

*Primary Examiner* — Eric J. Bycer
(74) *Attorney, Agent, or Firm* — Ladas & Parry, LLP

(57) ABSTRACT

A system comprising: an input receiving an input document comprising text data and graphical data distinguishing hierarchically first and second portion of the text data; a display displaying said input document; a user interface allowing a user to add, in superposition with the displayed input document, boundary markers visually bounding said first and second text portions; and a processor arranged for, using the boundary markers added to the displayed input document, training a layout data analysis model to determine, in a further input document having further text data, if graphical data distinguishes hierarchically first and second portions of the further text data to display automatically boundary markers visually bounding said first and second portions of said further text data; the user interface allowing said user to correct the boundary markers displayed by the layout analysis model and the processor training the layout data analysis model using the corrected boundary markers.

15 Claims, 11 Drawing Sheets

(56) References Cited

U.S. PATENT DOCUMENTS

| | | | |
|---|---|---|---|
| 2006/0104511 A1* | 5/2006 | Guo | G06K 9/00469 |
| | | | 382/176 |
| 2006/0271847 A1* | 11/2006 | Meunier | G06K 9/00469 |
| | | | 715/205 |
| 2006/0288278 A1* | 12/2006 | Kobayashi | G06F 40/154 |
| | | | 715/209 |
| 2011/0082868 A1* | 4/2011 | Musuluri | G06F 40/284 |
| | | | 707/749 |
| 2016/0103823 A1* | 4/2016 | Jackson, Jr. | G06F 40/205 |
| | | | 704/9 |
| 2016/0292275 A1* | 10/2016 | Talton | G06F 16/958 |
| 2018/0373952 A1* | 12/2018 | Bui | G06Q 10/06 |
| 2019/0073528 A1* | 3/2019 | Agarwalla | G06K 9/6256 |
| 2019/0220503 A1* | 7/2019 | Gelosi | G06F 40/131 |
| 2019/0377779 A1* | 12/2019 | Gelosi | G06F 40/51 |
| 2020/0134388 A1* | 4/2020 | Rohde | G06F 8/38 |
| 2020/0342053 A1* | 10/2020 | Mwarabu | G06F 40/289 |

* cited by examiner

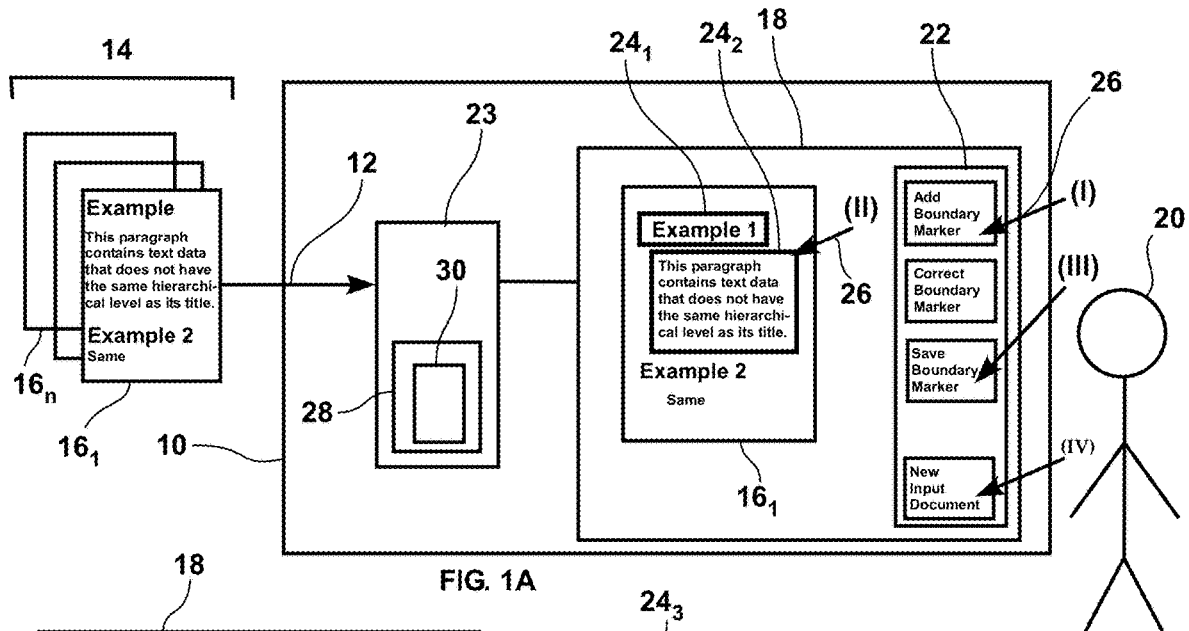
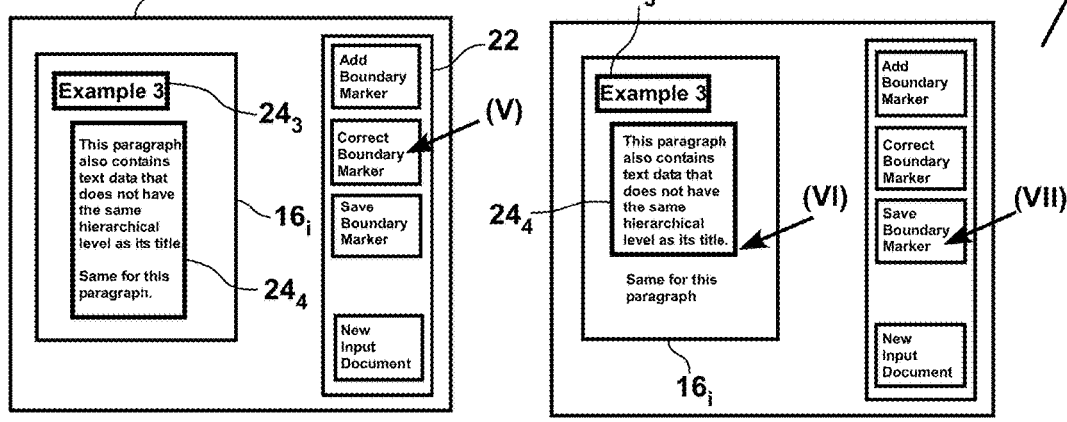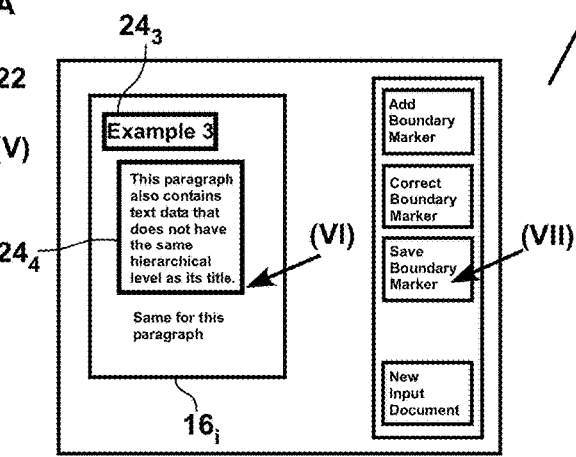
FIG. 1B  FIG. 1C
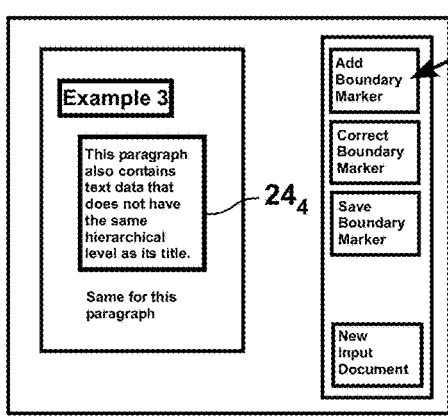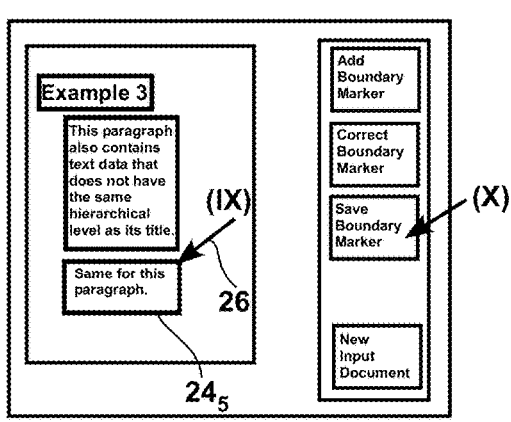
FIG. 1D  FIG. 1E

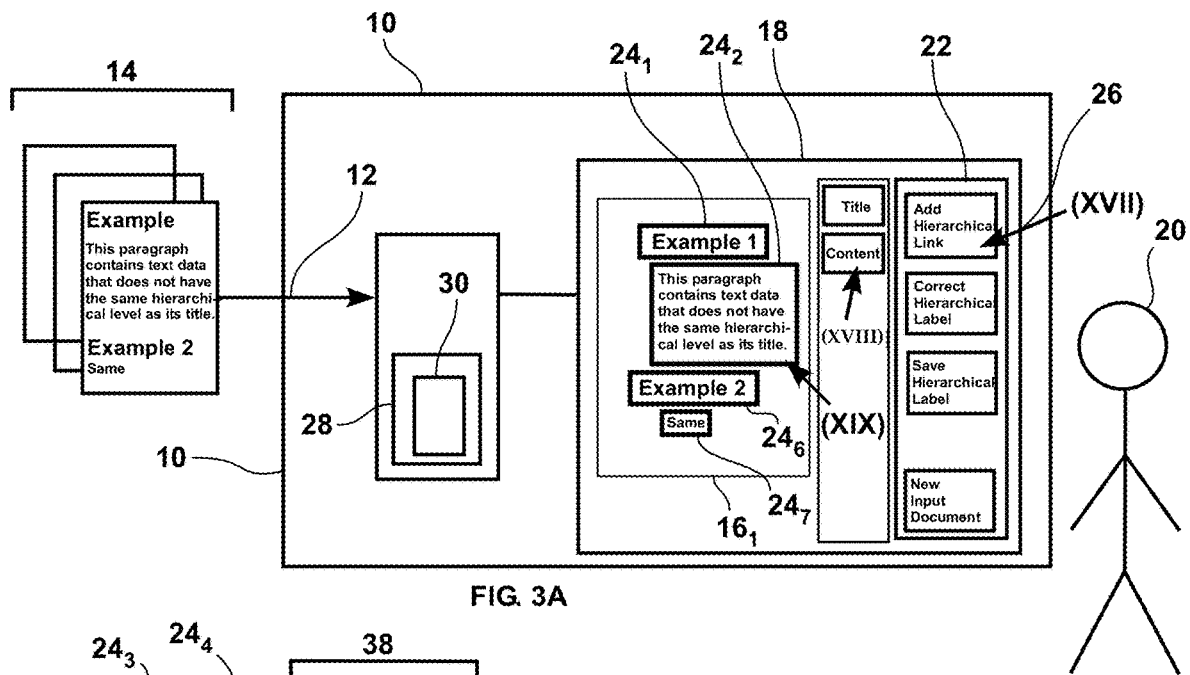
FIG. 3A
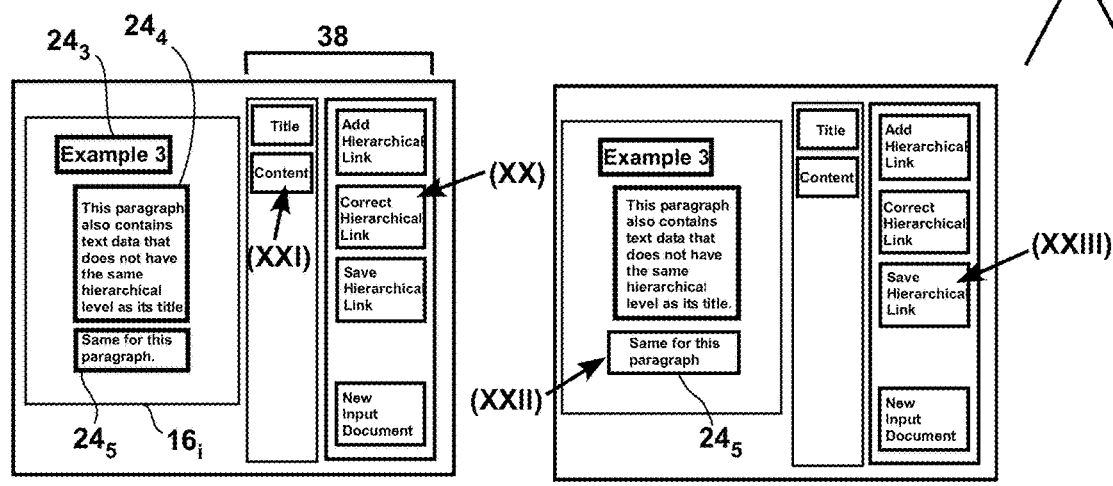
FIG. 3B
FIG. 3C

Relationship Extraction

Hierarchy in Rows and Columns

|  | July 2, 2016 | June 27, 2015 |
|---|---|---|
| United States | $ 145,160,557 | $ 147,296,586 |
| Canada and other | 4,709,213 | 3,858,753 |
| | $ 149,869,770 | $ 151,155,339 |
| Long-lived assets excluding financial instruments: | | |
| United States | $ 30,304,356 | $ 33,157,713 |
| Canada and other | 2,609,206 | 4,106,322 |
| | $ 32,918,562 | $ 37,264,035 |

|  | July 2, 2016 | June 27, 2015 |
|---|---|---|
| United States | $ 145,160,557 | $ 147,296,586 |
| Canada and other | 4,709,213 | 3,858,753 |
| | $ 149,869,770 | $ 151,155,339 |
| Long-lived assets excluding financial instruments: | | |
| United States | $ 30,304,356 | $ 33,157,713 |
| Canada and other | 2,609,206 | 4,106,322 |
| | $ 32,918,562 | $ 37,264,035 |

FIG. 10

Extracted Table of Contents

1. YETI Reports Fourth Quarter and Fiscal Year 2018 Financial Results
   a. Fourth Quarter Fiscal 2018 Highlights as Compared to Fourth Quarter Fiscal 2017
   b. For the Three Months (Thirteen Weeks) Ended December 29, 2018
      i. Net Sales
      ii. Gross Profit
      iii. Selling, General, and Administrative ("SG&A") expenses
      iv. Operating Income
      v. Adjusted Operating Income
      vi. Net Income
      vii. Adjusted Net Income
      viii. Adjusted EBITDA
   c. For the Twelve Months (Fifty-Two Weeks) Ended December 29, 2018
      i. Net Sales
      ii. Operating Income
      iii. Adjusted Operating Income
      iv. Net Income
      v. Adjusted Net Income
      vi. Adjusted EBITDA
   d. Balance Sheet and Cash Flow Highlights
      i. Inventory
      ii. Total Debt
      iii. Cash flow provided by operating activities
   e. For Fiscal 2019 the Company's Outlook is as follows:
      i. Net sales
      ii. Operating income as a percentage of net sales
      iii. Adjusted Operating Income as a percentage of net sales
      iv. An effective tax rate
      v. Net income per diluted share
      vi. Adjusted Net Income per diluted share
      vii. Diluted weighted average shares outstanding
      viii. Adjusted EBITDA
      ix. Capital expenditures
      x. Debt repayments

FIG. 11

GRAPHICAL USER INTERFACE SYSTEMS FOR GENERATING HIERARCHICAL DATA EXTRACTION TRAINING DATASET

TECHNICAL FIELD

This presentation relates to Graphical User Interfaces (GUI) systems for generating a written document hierarchical data training dataset, wherein said training dataset can be used to train a machine learning system to parse written documents in a manner similar to how humans do, as a function of hierarchical data conveyed by the layout of the written documents.

BACKGROUND

Many known machine learning systems use only plain text as input. It follows that when said known machine learning systems receive written documents (e.g. encoded as ".pdf" format documents) as input, they perform a conversion to plain text as a first step of document analysis. However, a wealth of hierarchical data that can be used as training signals is generally also present in most written documents, for example in the form of positional and stylistic information relative to the text data of the written documents. Consequently, when the known machine learning systems perform a conversion to plain text as a first step of document analysis, they effectively lose a substantial portion of the information contained in the written document. There exists a need for tools arranged to extract hierarchical data from written documents, which can for example generate a training dataset comprising the extracted hierarchical data for use in training a further machine learning system to parse written documents in a way that pays attention to the extracted hierarchical data.

SUMMARY

Embodiments of this presentation comprise Graphical User Interface (GUI) systems having a learning capability and arranged for detecting different hierarchical groups within the text data of a written document. In this presentation, a text data comprises different hierarchical groups if it comprises a plurality of series of (one or more) words that are each grouped together, as for example a plurality of paragraphs in a page. According to embodiments of this presentation, different hierarchical groups can have a different hierarchical level, as for example a title of a page has a higher hierarchical level than a paragraph in that page, or a same hierarchical level, as for example two paragraphs under a same title in a page. Alternative graphical syntaxes can be used to graphically distinguish hierarchical group levels, such as using different font styles or size.

Embodiments of this presentation comprise Graphical User Interface (GUI) systems having a learning capability and arranged for further detecting hierarchical links between different hierarchical groups of the text data of the written document.

Embodiments of this presentation comprise Graphical User Interface (GUI) systems having a learning capability and arranged for further detecting different hierarchical labels that can be associated with different hierarchical groups of the text data of the written document.

Embodiments of this presentation discloses systems arranged to extract a plurality of hierarchical features from written documents in an automated fashion. By automating this extraction process, embodiments of this presentation enable feeding more meaningful inputs to downstream machine learning systems, whereby reducing the amount of labeled training data required to extract structured information from semi-structured written documents.

Embodiments of this presentation comprise a system with: an input receiving an input document comprising text data and graphical data distinguishing first and second portion of the text data as different hierarchical groups; a display displaying said input document; a user interface allowing a user to add, in superposition with the displayed input document, boundary markers visually bounding said first and second text portions; and a processor arranged for, using the boundary markers added to the displayed input document, training a layout data analysis model to determine, in a further input document having further text data, if graphical data distinguishes hierarchically first and second portions of the further text data as different hierarchical groups and, if it is so, to display automatically boundary markers visually bounding said first and second portions of said further text data. According to embodiments of this presentation, the user interface further allows said user to correct the boundary markers displayed by the layout analysis model and the processor is arranged to train the layout data analysis model using the corrected boundary markers.

Embodiments of this presentation comprise a Graphical User Interface (GUI) system comprising: an input arranged for receiving a plurality of first input documents, each first input document comprising first text data as well as first graphical data indicative of a first portion of the first text data and a second portion of the first text data forming different hierarchical groups within said first text data; a display arranged for displaying each of said first input documents to a user; a first user interface arranged for allowing said user to add, in superposition with each displayed first input document, a boundary marker provided for visually bounding at least one of said first and second portions of said first text data; and a processor arranged for, using the boundary markers added to the displayed first input documents, training a layout data analysis model to determine, in a second input document having second text data, if a first portion of said second text data and a second portion of said second text data form different hierarchical groups and, if so, to display automatically in superposition with said second input document a boundary marker visually bounding at least one of said first and second portions of said second text data; wherein the first user interface is further provided to allow said user to correct the boundary markers displayed by the layout analysis model on said second input document; the processor being further arranged for training said layout data analysis model using the boundary markers corrected by the user and said second input document.

According to embodiments of this presentation, said GUI system further comprises a second user interface arranged for allowing said user to create a hierarchical link between any two displayed boundary markers, said hierarchical link comprising information about relative hierarchical levels the two linked boundary markers; the second user interface being further arranged for visually illustrating the hierarchical links; the processor being further arranged for, using the hierarchical links created between the displayed boundary markers, training said layout data analysis model to determine if a hierarchical link exists in said second input document having second text data between boundary markers visually bounding said first and second portions of said second text data; and, if so, to display automatically any hierarchical link existing between displayed boundary markers; wherein the second user interface is further provided to allow said user to correct the hierarchical links displayed by the layout analysis model on said second input document; the processor being further arranged for training said layout data analysis model using the hierarchical links corrected by the user and said second input document.

According to embodiments of this presentation, said visually illustrating the hierarchical links comprises joining a selected boundary marker to each hierarchically linked boundary marker by a line having a vertical segment of first horizontal position if the hierarchical link to the selected boundary marker is ascending and having a vertical segment of second horizontal position if the hierarchical link to the selected boundary marker is descending.

According to embodiments of this presentation, said GUI further comprises a third user interface arranged for allowing said user to associate a hierarchical label to each displayed boundary marker; the third user interface being further arranged for visually illustrating the hierarchical label of each displayed boundary marker; the processor being further arranged for, using the hierarchical labels associated to the displayed boundary markers, training said layout data analysis model to determine if said first and second portions of said second text data can be associated to any of said hierarchical labels; and, if so, to display automatically the hierarchical labels associated to the displayed boundary markers; wherein the third user interface is further provided to allow said user to correct the hierarchical labels associated by the layout analysis model to said first and second portions of said second text data; the processor being further arranged for training said layout data analysis model using the hierarchical labels corrected by the user and said second input documents.

According to embodiments of this presentation, said visually illustrating the hierarchical label of each displayed boundary marker comprises coloring the outlines of each displayed boundary marker in a color associated to the hierarchical label of said displayed boundary marker.

According to embodiments of this presentation, said visually illustrating the hierarchical links comprises making a first change and a second change to a selected displayed boundary marker; making said first change to each hierarchically linked boundary marker having a hierarchical level higher than the selected boundary marker and making said second change to each hierarchically linked boundary marker having a hierarchical level lower than the selected boundary marker.

According to embodiments of this presentation, each boundary markers comprises a line circumscribing the text data portion it visually bounds, and: said first change comprises displaying the boundary marker line thicker and said second change comprises filling said boundary marker with a transparent color.

According to embodiments of this presentation, said hierarchically linked boundary marker having a hierarchical level higher than the selected boundary marker only comprise hierarchically linked boundary markers having the lowest hierarchical level above the hierarchical level of said selected boundary marker; and said hierarchically linked boundary marker having a hierarchical level lower than the selected boundary marker only comprise hierarchically linked boundary markers having the highest hierarchical level below the hierarchical level of said selected boundary marker.

Other embodiments of this presentation include a Graphical User Interface (GUI) system comprising: an input interface arranged for receiving a plurality of first input documents, each first input document comprising: first text data as well as first graphical data indicative of a first portion of the first text data and a second portion of the first text data forming different hierarchical groups within said first text data; a boundary marker visually bounding each of said first and second portions of said first text data; a display arranged to display to a user each first input document with said boundary markers in superposition; a first user interface arranged for allowing said user to create and display a hierarchical link between the displayed boundary markers, said hierarchical link comprising information about relative hierarchical levels of the two linked boundary markers; and a processor arranged for, using the hierarchical links and the first input documents: training a layout data analysis model to determine, in a second input document having second text data, if a first portion of said second text data and a second portion of said second text data form different hierarchical groups and, if so, training said layout data analysis model to further determine what hierarchical link exists between said first and second portions of the second text data; the first user interface being arranged to display automatically in superposition with said second input document a boundary marker visually bounding said first and second portions of said second text data as well as the hierarchical link determined by the layout data analysis model; wherein the first user interface is further provided to allow said user to correct the boundary markers or the hierarchical link automatically displayed by the layout analysis model on said second input document; the processor being further arranged for training said layout data analysis model using any boundary marker or hierarchical link corrected by the user and said second input document.

According to embodiments of this presentation, said visually illustrating the hierarchical links comprises joining a selected boundary marker to each hierarchically linked boundary marker by a line having a vertical segment of first horizontal position if the hierarchical link to the selected boundary marker is ascending and having a vertical segment of second horizontal position if the hierarchical link to the selected boundary marker is descending.

According to embodiments of this presentation, said GUI system further comprises a second user interface arranged for allowing said user to associate a hierarchical label to each displayed boundary marker; the second user interface being further arranged for visually illustrating the hierarchical label of each displayed boundary marker; the processor being further arranged for, using the hierarchical labels associated to the displayed boundary markers, training said layout data analysis model to determine if said first and second portions of said second text data can be associated to any of said hierarchical labels; and, if so, to display automatically the hierarchical labels associated to the displayed boundary markers; wherein the second user interface is further provided to allow said user to correct the hierarchical labels associated by the layout analysis model to said first and second portions of said second text data; the processor being further arranged for training said layout data analysis model using the hierarchical labels corrected by the user and said second input documents.

According to embodiments of this presentation, said visually illustrating the hierarchical label of each displayed boundary marker comprises coloring the outlines of each displayed boundary marker in a color associated to the hierarchical label of said displayed boundary marker.

According to embodiments of this presentation, said visually illustrating the hierarchical links comprises making a first change and a second change to a selected displayed boundary marker; making said first change to each hierarchically linked boundary marker having a hierarchical level higher than the selected boundary marker and making said second change to each hierarchically linked boundary marker having a hierarchical level lower than the selected boundary marker.

According to embodiments of this presentation, each boundary marker comprises a line circumscribing the text data portion it visually bounds; wherein said first change comprises displaying the boundary marker line thicker and wherein said second change comprises filling said boundary marker with a transparent color.

According to embodiments of this presentation, said hierarchically linked boundary marker having a hierarchical level higher than the selected boundary marker only comprise hierarchically linked boundary markers having the lowest hierarchical level above the hierarchical level of said selected boundary marker; and said hierarchically linked boundary marker having a hierarchical level lower than the selected boundary marker only comprise hierarchically linked boundary markers having the highest hierarchical level below the hierarchical level of said selected boundary marker.

BRIEF DESCRIPTION OF THE DRAWINGS

FIGS. 1A to 1E illustrate a teachable GUI system arranged for detecting different hierarchical groups within the text data of a written document.

FIGS. 3A to 3C illustrate a teachable GUI system arranged for detecting hierarchical labels of portions of text data forming different hierarchical groups.

FIG. 4 is a partial reproduction of a display of a GUI such as shown in FIGS. 1A to 1E.

FIG. 7 is a partial reproduction of a display of a GUI such as shown in FIGS. 2A to 2C.

FIG. 8 comprises three partial reproductions of a display of a GUI such as shown in FIGS. 2A to 2C.

FIG. 9 is a partial reproduction of a display of a GUI such as shown in FIGS. 2A to 2C.

FIG. 10 is a partial reproduction of a display of a GUI such as shown in FIGS. 2A to 2C.

FIG. 11 illustrates a portion of a training dataset such as generated by embodiments of this presentation.

DETAILED DESCRIPTION

Figure 2A:
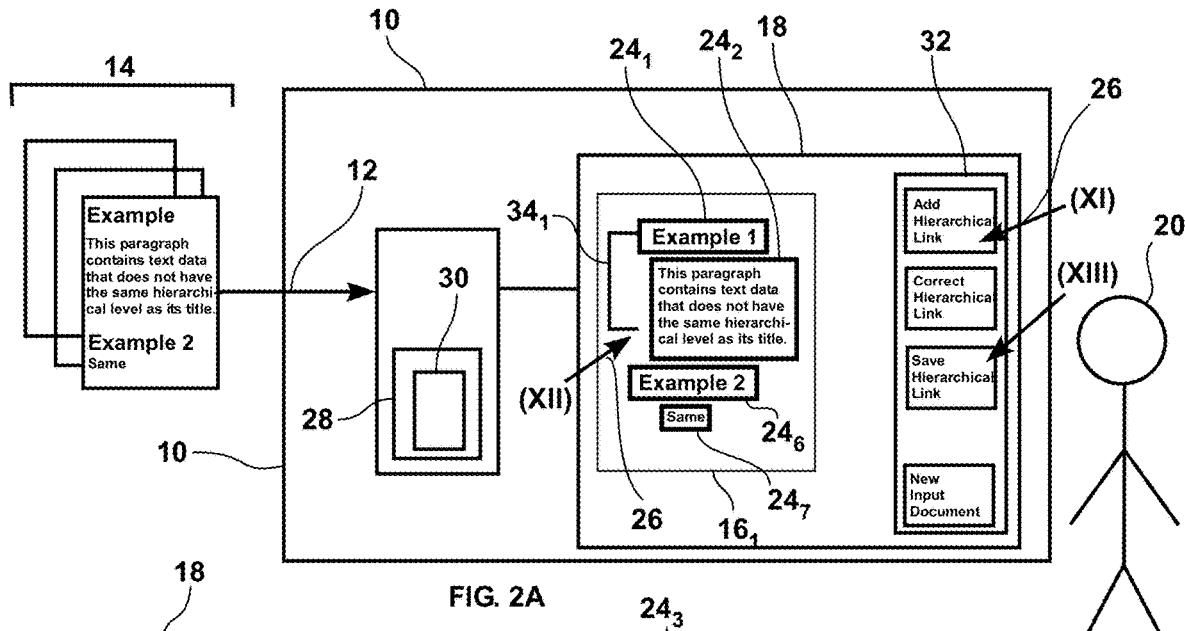
FIGS. 2A to 2C illustrate a teachable GUI system arranged for detecting hierarchical links between portions of text data forming different hierarchical groups.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the claimed invention.

FIG. 1A illustrates a Graphical User Interface (GUI) system 10 according to embodiments of this presentation, which comprises a data input 12 (for example an input port) arranged for receiving a set/plurality 14 of n manual training text documents $16_i$ (i=1 to n, with n an integer). According to embodiments of this presentation, each manual training text document (document $16_1$ illustrated) comprises text data (in the figure, the exemplary text data comprises "Example 1" "This paragraph . . . ") as well as graphical data indicating that different portions of the text data form different hierarchical groups. In the illustration, a first portion of text data ("Example 1") uses a larger font than a second portion of text data ("This paragraph . . . ") and is also indented to the left of the second portion of text data. Both the font size difference and indentation are layout/graphical data that indicate that the first and second portions of the text data form different hierarchical groups. In the illustrated example, the left justification of the words in the text data constitutes graphical data distinguishing various hierarchical groups in the text data, wherein the more the words of a hierarchical group are justified to the left, the highest the hierarchical level of the hierarchical group. According to embodiments of this presentation, a second hierarchical group having a hierarchical level lower than a first hierarchical group means that the second hierarchical group relates to information that is a detail of the information in the first hierarchical group). Other graphical data can exist to indicate different hierarchical levels, including bolded fonts, bullet points, change of font or style of font (italics) or positional info such as found in a table.

According to embodiments of this presentation, system 10 comprises a display 18 arranged for displaying each of said first input documents $16_i$ to a user 20, and a first user interface 22 arranged for allowing user 20 to create/add, in superposition with each displayed first input document $16_i$ (document $16_1$ illustrated), a boundary marker 24j (with j an integer) provided for visually bounding the different portions of the text data that user 20 identifies as forming different hierarchical groups. In the embodiment illustrated, user interface 22 comprises a plurality of command buttons ("Add Boundary Marker", "Correct Boundary Marker", "Save Boundary Marker" and "New Input Document" that can be displayed on a portion of display 18 and can be actuated using a mouse or touchscreen interface hardware. The command buttons can also alternatively be hardware buttons. In the embodiment illustrated, once the "Add Boundary Marker" button is activated (I), for example by clicking an interface pointer 26, user 20 can create any number of new boundary markers 24j by clicking interface pointer 26 from one desired corner to a diagonally opposite desired corner of a desired new boundary marker.

FIG. 1A illustrates a new boundary marker 242 completed by clicking (II) interface pointer 26 at a desired location of a corner of boundary marker 242, opposite a corner previously formed. According to an embodiment of this presentation, interface 22 comprises a control button "Save Boundary Marker" that can be clicked (III) to save the latest created marker(s). Alternatively, interface 22 can be provided to save any boundary marker once it is created. As illustrated in FIG. 1A, interface 22 can comprise a command button ("New Input Document" in FIG. 1A) for instructing (IV) the system to display a further input document 16i, thus allowing user 20 to add boundary markers 24j where appropriate in the further input document. It is to be noted that in FIG. 1A, user 20 has not finished adding all the boundary markers that can be added to document $16_1$. Ideally, user 20 would add a boundary marker around the text "Example 2" and one boundary marker around the text "Same".

As illustrated in FIG. 1A, display 18 and interface 22 can be coupled to a processing unit 23 of system 10 that is itself coupled to input 12 and is arranged to receive and store the documents 16i. According to embodiments of this presentation, interface 22 comprises a processor 28 (illustrated as being included in processing unit 23) arranged for, using the boundary markers 24*j* added by user 20 to each displayed input document 16*i*, training a layout data analysis model 30 to recognize if there exist different hierarchical groups in any document comprising text data that is presented to the model and, if such different hierarchical groups exist, comprising different text data portions, to automatically display, in superposition with the document, boundary markers around said text data portions. According to embodiments of this presentation, processor 28 allows toggling on and off the model 30 automatically displaying boundary markers generated by model 30. According to embodiments of this presentation, processor 28 can toggle on the automatic display of boundary markers only after user 20 has drawn the boundary boxes of a predetermined number of documents 16*i* (to ensure that model 30 received enough training data to train properly before displaying the results obtained by model 30).

FIG. 1B illustrates display 18 displaying a further document 16*i* that comprises text data ("Example 3", "This paragraph also . . . "), and automatically displaying in superposition boundary markers 24₃, 24₄ around two text data portions ("Example 3" and "This paragraph also . . . ") identified by model 30 as having each a different hierarchical value. According to embodiments of this presentation, user interface 22 is further provided to allow user 20 to correct any of the boundary markers (24₃, 24₄) displayed by model 30 on document 16*i*. As illustrated in FIG. 1B, interface 22 can comprise a command button "Correct Boundary Marker" that, once pressed (V), allows user 20 to correct any boundary marker, for example by selecting a corner of a boundary marker and moving the corner where desired.

FIG. 1C shows document 16*i* on display 18 after user 20 has selected then moved upward a desired corner of boundary marker 244 to a desired position (VI). As also illustrated in FIG. 1C, User 20 could then save the modified boundary marker 244, for example by clicking on the "Save Boundary Marker" button (VII), which can send the new data to model 30 for the training of model 30.

In the example illustrated, user 20 has decided that the boundary marker 24₄ originally displayed by model 30 should be replaced by two boundary markers, each bounding a separate paragraph of text. In the illustrated example, in FIG. 1C user 20 has changed the size of boundary marker 24₄ so that it bounds one of the desired paragraphs.

In FIG. 1D, user 20 uses interface 22 to create a new boundary marker by clicking (VIII) on the button "Add Boundary Marker" and in FIG. 1E, user 20 uses interface 22 to create the new boundary marker 245 by indicating with cursor 26 the position of a first corner then of an opposite corner (IX). User 20 can then save boundary marker 245 by clicking (X) on the button "Save Boundary Marker", which can send the new data to model 30 for the training of model 30. Alternatively, the corrected/new data can be sent to model 30 at the same time for example when user 20 requests a new input document via interface 22. An advantageous technical feature of system 10 is that the more model 30 is trained, the more accurately it generates and automatically displays boundary markers. According to an embodiment of this presentation, once user 20 is satisfied that the boundary markers generated and automatically displayed by model 30 are satisfactory, system 10 can be used for generating a series of training written documents having boundary markers around hierarchical groups of words/text data having a same hierarchical level in the written document. As detailed hereafter, such series of training documents can be used to train specific machine learning systems.

A surprising effect of the use in combination of interface 22 and model 30 is that a system using this combination effectively distinguishes hierarchical groups in any input text document, whatever be the graphical syntax used to distinguish the hierarchical groups in the text document and in spite of the vast array of graphical syntaxes available to do so. Indeed, interface 22 allows a user to versatilely identify any hierarchical group by creating/modifying a boundary marker, and therefore to convey to model 30 the information of what words/group of words in an input text document form hierarchical groups, whatever be the graphical syntax used to distinguish the hierarchical groups in the text document.

According to embodiments of this presentation, the written documents 14 used for initially training model 30 can be different from the written documents on which training model 30 automatically draws boundary markers that are to be eventually corrected by user 20. According to embodiments of this presentation, the written documents 14 used for initially training model 30 can also be the same as those on which training model 30 automatically draws boundary markers that are to be eventually corrected by user 20.

As illustrated in FIG. 2A, according to embodiments of this presentation, system 10 comprises a second user interface 32 arranged for allowing user 20 to create a hierarchical link between any two displayed boundary markers, for example hierarchical markers 24₁ and 24₂ as previously shown in FIG. 1A and interface 32 can be arranged for displaying/visually illustrating the hierarchical links. As illustrated in FIG. 2A, interface 32 can comprise a plurality of command buttons ("Add Hierarchical Link", "Correct Hierarchical Link", "Save Hierarchical Link" and "New Input Document" that can be displayed on a portion of display 18 and can be actuated using a mouse or touchscreen interface hardware. The command buttons can also alternatively be hardware buttons. In the embodiment illustrated, once the "Add Hierarchical Link" button is activated (XI), for example using interface pointer 26, user 20 can create any number of new hierarchical link 34*j* by clicking interface pointer 26 on a first displayed boundary marker (24₁ illustrated) then pulling (XII) a free end of a displayed hierarchical link (34₁ illustrated) originating at the first boundary marker with interface pointer 26 to another boundary marker (24₂ illustrated). According to embodiments of this presentation, an alternative flow comprises: —click boundary marker, click "Add Hierarchical Links", click other boundary markers to establish links; and finally click save.

According to an embodiment of this presentation, the second user interface 32 comprises an "add children" button (not shown) that enables the user to select all boundary markers that a given boundary marker is the parent of. According to an embodiment of this presentation, once the free end of a hierarchical link originating from a first boundary marker is contacted with a second boundary marker, a new hierarchical link is created between the first and second boundary markers.

According to embodiments of this presentation, the hierarchical link can be stored/saved upon clicking (XIII) with interface pointer 26 on the button "Save Hierarchical Link". According to embodiments of this presentation, the hierarchical link can be stored/saved as soon as it is created. It is to be noted that in FIG. 2A, user 20 has not finished adding all the hierarchical links that can be added to document 16₁. Ideally, user 20 would add a hierarchical link between boundary marker 246 (around the text "Example 2") and boundary marker 247 (around the text "Same").

According to embodiments of this presentation, processor 28 is further arranged for, using the hierarchical links 34$j$ created between the displayed boundary markers 24$i$ of a number of training documents, training layout data analysis model 30 to determine if a hierarchical link exists in said any input text document, between boundary markers generated by model 30 and displayed on the input text document and, if so, to display automatically any hierarchical link existing between displayed boundary markers.

According to embodiments of this presentation, processor 28 allows toggling on and off the model 30 automatically displaying the hierarchical links generated by model 30. According to embodiments of this presentation, processor 28 can toggle on the automatic display of hierarchical links only after user 20 has drawn the hierarchical links of a predetermined number of documents 16$i$ (to ensure that model 30 received enough training data to train properly before displaying the results obtained by model 30).

According to embodiments of this presentation, user interface 32 is further provided to allow user 20 to correct the hierarchical links 34$j$ automatically displayed by the layout analysis model 30 on any text input document; processor 28 being further arranged for training layout data analysis model 30 using the hierarchical links corrected by the user on displayed text input document.

Figure 2B:
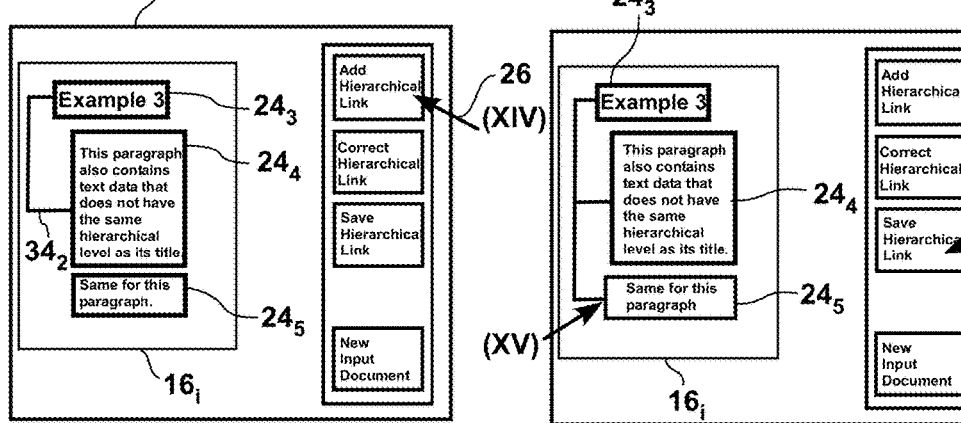
Figure 2C:
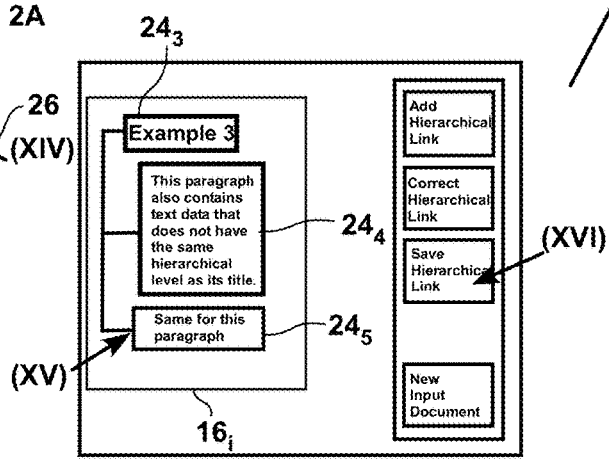

FIGS. 2B and 2C illustrate user 20 correcting a hierarchical link 34$2$ automatically displayed by model 30 on a text document 16$i$, by clicking (XIV) the "Add Hierarchical Link" then adding a hierarchical link between boundary markers 24$3$ and 24$5$ (mistakenly not found by model 30). The hierarchical link can be added by clicking first on boundary marker 24$3$ then clicking (XV) on boundary marker 24$5$, and clicking (XVI) on the button "Save Hierarchical Link".

According to embodiments of this presentation, the hierarchical links created by interface 32 can comprise information about the relative hierarchical levels of the two linked boundary markers. According to embodiments of this presentation, if each hierarchical link is displayed as a series of two horizontal lines joined by one vertical line, the horizontal position of the vertical line can be a function of the highest of the hierarchical levels of the boundary markers joined by the link. For example, if the hierarchical links are displayed in a left margin of the text documents, the higher this highest hierarchical level is, the more to the left the vertical line of the hierarchical link can be displayed. Alternatively, the horizontal position of the vertical line can be a function of the lowest of the hierarchical levels of the boundary markers joined by the link.

Alternatively, the horizontal position of the vertical line can be a function of the hierarchical level of a selected one of the boundary markers joined by the link. In such a case, selecting successively each of two boundary markers joined by a link results in toggling the horizontal position of the displayed link as a function of the hierarchical level of the selected boundary marker. In other words, in such embodiments the horizontal position of the hierarchical link related to a selected boundary marker will change whether the hierarchical link is ascending or is descending.

A surprising effect of the use in combination of interface 32, interface 22 and model 30 is that a system using this combination effectively recognizes hierarchical groups as well as hierarchical links between the hierarchical groups in any input text document, whatever be the graphical syntax used to distinguish the hierarchical groups and any hierarchical links between the hierarchical groups in the text document, and in spite of the vast array of graphical syntaxes available to do so. Indeed, interface 22 allows a user to versatilely identify any hierarchical group by creating/modifying a boundary marker and interface 32 allows to versatilely identify any hierarchical link between the identified groups, and therefore to convey to model 30 the information of what words/group of words in an input text document form hierarchical groups and how they are linked, whatever be the graphical syntax used to distinguish the hierarchical groups in the text document.

It is noted that according to embodiments of this presentation, model 30 can be arranged to incorporate textual information present in two hierarchical groups in order to determine if there exists a hierarchical link between the two hierarchical groups. Textual information can include the semantic meaning of the text in hierarchical groups, for example, the meaning of the use of the text symbols VII./a./1./A. in legal documents. According to embodiments of this presentation, model 30 incorporates this textual information as well to make decisions about whether or not there exist hierarchical links, as a fallback when graphical syntax is insufficient.

As illustrated in FIG. 3A, according to embodiments of this presentation, system 10 comprises a third user interface 38 arranged for allowing user 20 to associate a hierarchical label to each displayed boundary marker. According to embodiments of this presentation, interface 38 is arranged to let user 20 choose the label to be associated by clicking a pre-existing label button in a displayed button list 40. Illustrated in FIG. 3A. The label buttons "Title" and "Content" are illustrated in FIG. 3A. According to embodiments of this presentation, interface 38 is provided to allow user 20 to create a label and a label button. According to embodiments of this presentation, interface 38 further comprises a number of control buttons, including "Add Hierarchical Label," "Correct Hierarchical Label," "Save Hierarchical Label," and "New Input Document".

According to embodiments of this presentation, interface 38 is arranged for visually illustrating the hierarchical label of each displayed boundary marker (i.e. the hierarchical label associated to each displayed boundary marker). According to embodiments of this presentation, a different color is associated to each hierarchical label and interface 38 visually illustrates the hierarchical label of each displayed boundary marker by displaying each boundary marker in the color of its associated hierarchical label. In FIG. 3A, user 20 has already associated boundary markers 24$_1$ and 24$_6$ each to the hierarchical label "Title". This label is associated to the color yellow, and each of boundary markers 24$_1$ and 24$_6$ are displayed in yellow.

FIG. 3A further illustrates user 20 associating boundary marker 24$2$ with the label "Content", by first clicking (XVII) on the button "Add Hierarchical Label" of interface 38, then clicking (XVIII) on the button "Content", then clicking (XIX) on boundary marker 24$2$. It is noted that according to alternative embodiments, the button "content" could be clicked on after clicking on the boundary market that is to be associated with it. In FIG. 3A the color green is associated to the label "Content" and therefore upon clicking on boundary marker 24$2$ in the illustrated example, boundary marker 24$2$ is colored green by interface 38. At this juncture, it is noted that in FIG. 3 the boundary markers are filled with the color of their markers. According to alternative embodiments, only the lines forming the boundary markers can be colored in the color of their label, as illustrated for example in FIGS. 5 to 10.

In FIG. 3A, boundary marker 24$_7$ has not yet been associated to a hierarchical label. However, user 20 will eventually recognize that boundary marker $24_7$ should be associated to the hierarchical label "content", and will associate boundary marker $24_7$ to the hierarchical label "content", for example as illustrated for boundary marker $24_2$ above.

At this juncture, it is to be noted that according to alternative embodiments of this presentation (not illustrated), interface 38 is arranged for labelling one or more boundary markers using the hierarchical links that exist between the boundary markers, as follows. Interface 38 then allows user 20 to: 1) Select a first boundary marker; 2); select a command (i.e. click a button) "add hierarchical label" (e.g. "add a child label"); 3) click the further boundary markers with which user 20 want to associate the selected first boundary marker. Interface 38 then automatically labels each further boundary marker with for the hierarchical label immediately below the hierarchical label of the first boundary marker; and 4) Click save or deselect to persist changes.

As illustrated in FIG. 3B, according to embodiments of this presentation processor 28 is further arranged for, using the hierarchical labels associated to the displayed boundary markers, training layout data analysis model 30 to determine if any displayed boundary marker of any input document can be associated to any of the hierarchical labels known to interface 38; and, if so, to display automatically the hierarchical labels associated to the displayed boundary markers. FIG. 3B illustrates system 10 wherein, after having trained model 30 over a number of input text document, a text document $16i$ is input to system 10 and processor 28 automatically determines to which labels each of boundary markers $24_3$, $24_4$ and $24_5$ are associated, and automatically displays its finding by coloring the boundary markers in the color of their label.

In FIG. 3B, it is assumed that model 30 has not yet been sufficiently trained and has mistakenly determined that boundary marker $24_5$ should be associated to the label "title" (whereas it should actually be associated to the label "Content"). According to embodiments of the present disclosure, user interface 38 is provided to allow user 20 to correct at will the hierarchical labels associated by layout analysis model 30 to any displayed boundary marker. According to embodiments of this presentation, user 20 can proceed by clicking (XX) on the button "Correct Hierarchical Label" then clicking (XXI) on the new label intended ("Content") then as illustrated in FIG. 3C clicking (XXII) on boundary marker $24_5$ and clicking (XXIII) on the button "Save Hierarchical Link".

According to embodiments of this presentation, processor 28 is further arranged for training layout data analysis model 30 using the hierarchical labels corrected by the user in an input document.

As for the other user interfaces, the illustrated control buttons of interface 38 are only described as exemplary, and they can be replaced by intuitive commands. For example and alternatively, clicking in a nondescript area of a displayed document and maintaining the mouse button pushed while dragging the cursor can signal the creation of a boundary marker; clicking on a boundary marker and maintaining the mouse button pushed while dragging the cursor can signal the change of the dimensions of said boundary marker in the direction the cursor is dragged; clicking successively on two boundary markers can signal establishing a hierarchical link between the two boundary markers; clicking on a single boundary marker then on a label can signal associating the boundary marker to the label; requiring the display of a new document can control the saving of all the changes made so far and the use of the saved data to teach model 30.

A surprising effect of the use in combination of interface 38, together with interface 32, interface 22 and model 30 is that a system using this combination effectively recognizes hierarchical groups as well as hierarchical links between the hierarchical groups and labels of the hierarchical groups in any input text document, whatever be the graphical syntax used to distinguish the hierarchical groups and any hierarchical links between the hierarchical groups in the text document, and in spite of the vast array of graphical syntaxes available to do so. As detailed above, interface 22 allows a user to versatilely identify any hierarchical group by creating/modifying a boundary marker, interface 32 allows to versatilely identify any hierarchical link between the identified groups. Further, interface 38 allows to versatilely identify the label associated with the identified groups, and therefore to convey to model 30 the information of how hierarchical groups of the text document are associated to labels, whatever be the graphical syntax used to distinguish the hierarchical groups in the text document.

Figure 4:
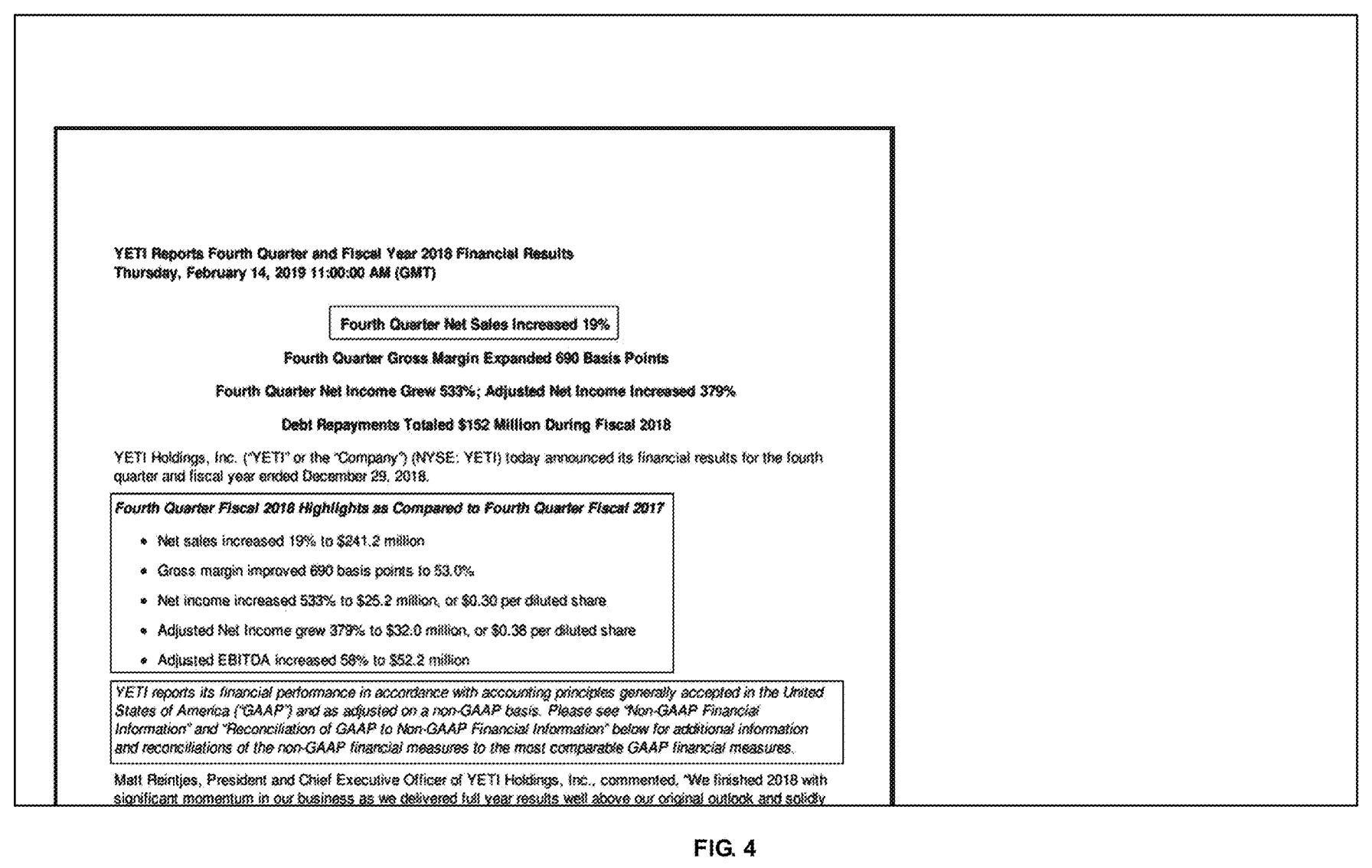

FIG. 4 illustrates an input text document being displayed by an embodiment of user interface 22 along with a plurality of boundary markers. It is noted that all possible boundary markers are not displayed on FIG. 4. According to embodiments of this presentation, interface 22 allows user 20 to add boundary markers where appropriate and to train model 30 with the added boundary markers.

Figure 5:
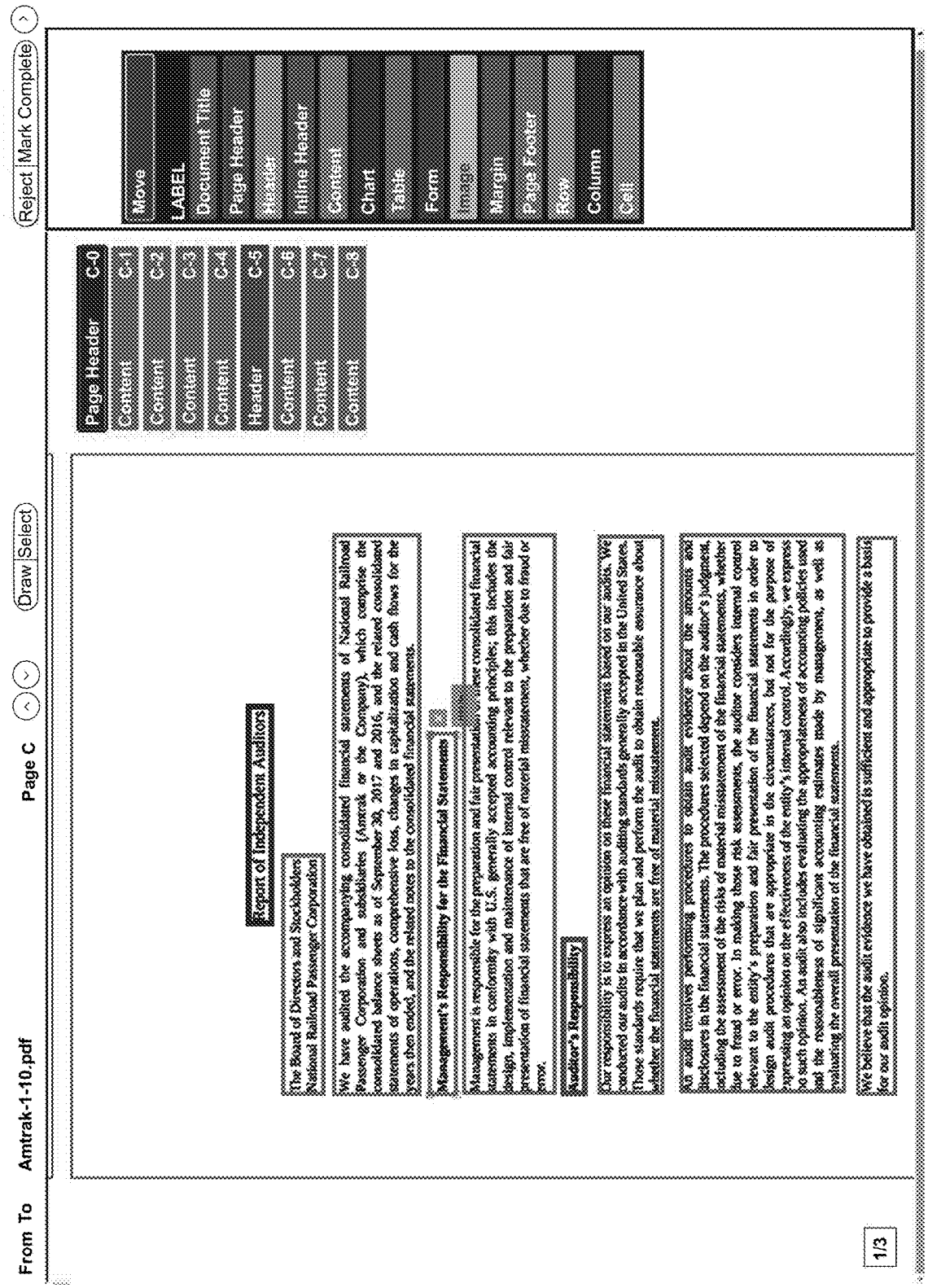
FIG. 5 is a partial reproduction of a display of a GUI such as shown in FIGS. 3A to 3C.

FIG. 5 illustrates an input text document displayed by an embodiment of user interface 38 along with a plurality of boundary markers colored in the color of the hierarchical label each boundary label has been found associated to by model 30. According to embodiments of this presentation, a small box showing the label associated to a boundary box can be displayed nearby any boundary marker selected by user 20. According to the embodiment illustrated in FIG. 5, the hierarchical label of each displayed boundary marker is shown/illustrated by coloring the outlines of each displayed boundary marker in a color associated to that hierarchical label. As illustrated in FIG. 5, according to embodiments of this presentation interface 38 can be provided to display a list of all the hierarchical labels found for all the displayed boundary markers.

Figure 6:
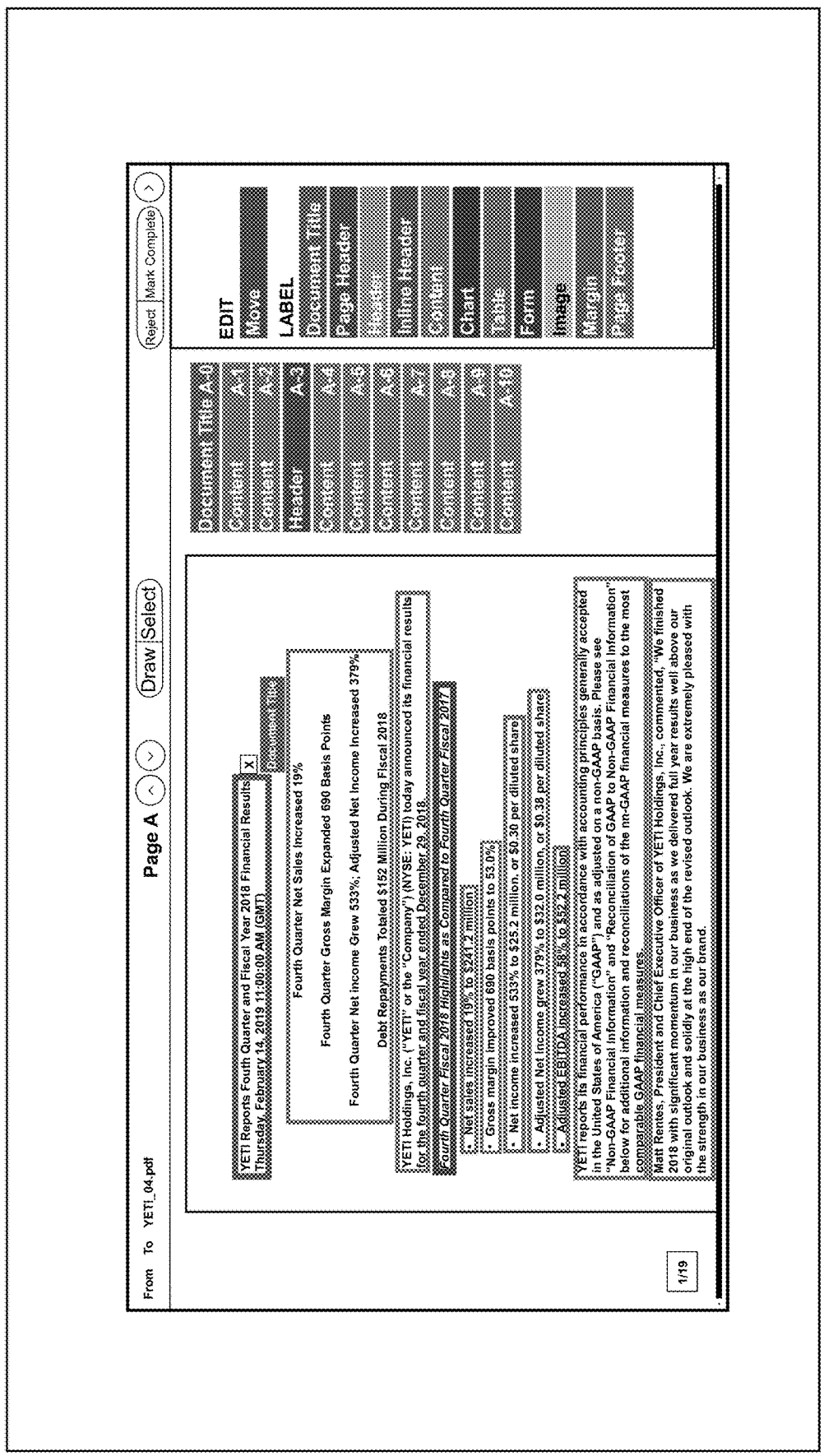
FIG. 6 is a partial reproduction of a display of a GUI such as shown in FIGS. 3A to 3C.

FIG. 6 is similar to FIG. 5 but illustrates another input text document displayed by user interface 38 than in FIG. 5.

Figure 7:
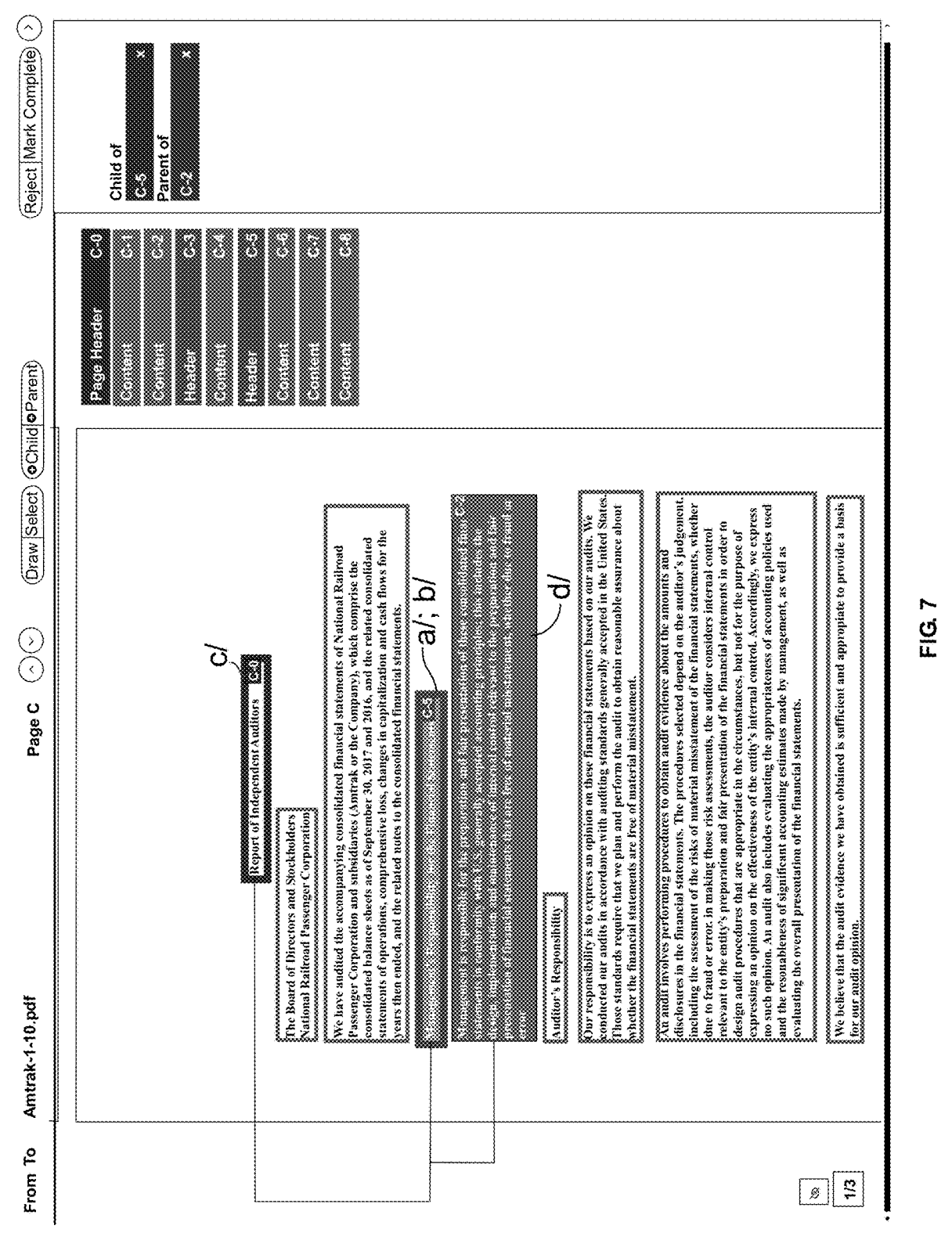

FIG. 7 illustrates the input text document of FIG. 5, displayed by an embodiment of user interface 38 along with a plurality of boundary markers colored in the color of their associated hierarchical label. According to embodiments of this presentation, the hierarchical links existing between a selected boundary marker are visually indicated as follows: a/ the outlines of the selected boundary marker are made thicker than before the boundary marker was selected; and b/ the selected boundary marker is filled with its associated color, in a hue more transparent than the outlines. Further, c/ each boundary marker hierarchically linked to the selected boundary marker, with a hierarchical level higher than the selected boundary marker, has its outlines made thicker; and d/ each boundary marker hierarchically linked to the selected boundary marker, with a hierarchical level lower than the selected boundary marker, is filled with its associated color.

According to embodiments of this presentation, only the hierarchically linked boundary markers having a hierarchical level immediately above the hierarchical level of a selected boundary marker are taken in account for feature c/ above, and only hierarchically linked boundary markers having a hierarchical level immediately below the hierarchical level of said selected boundary marker are taken in account for feature d/ above.

Figure 8:
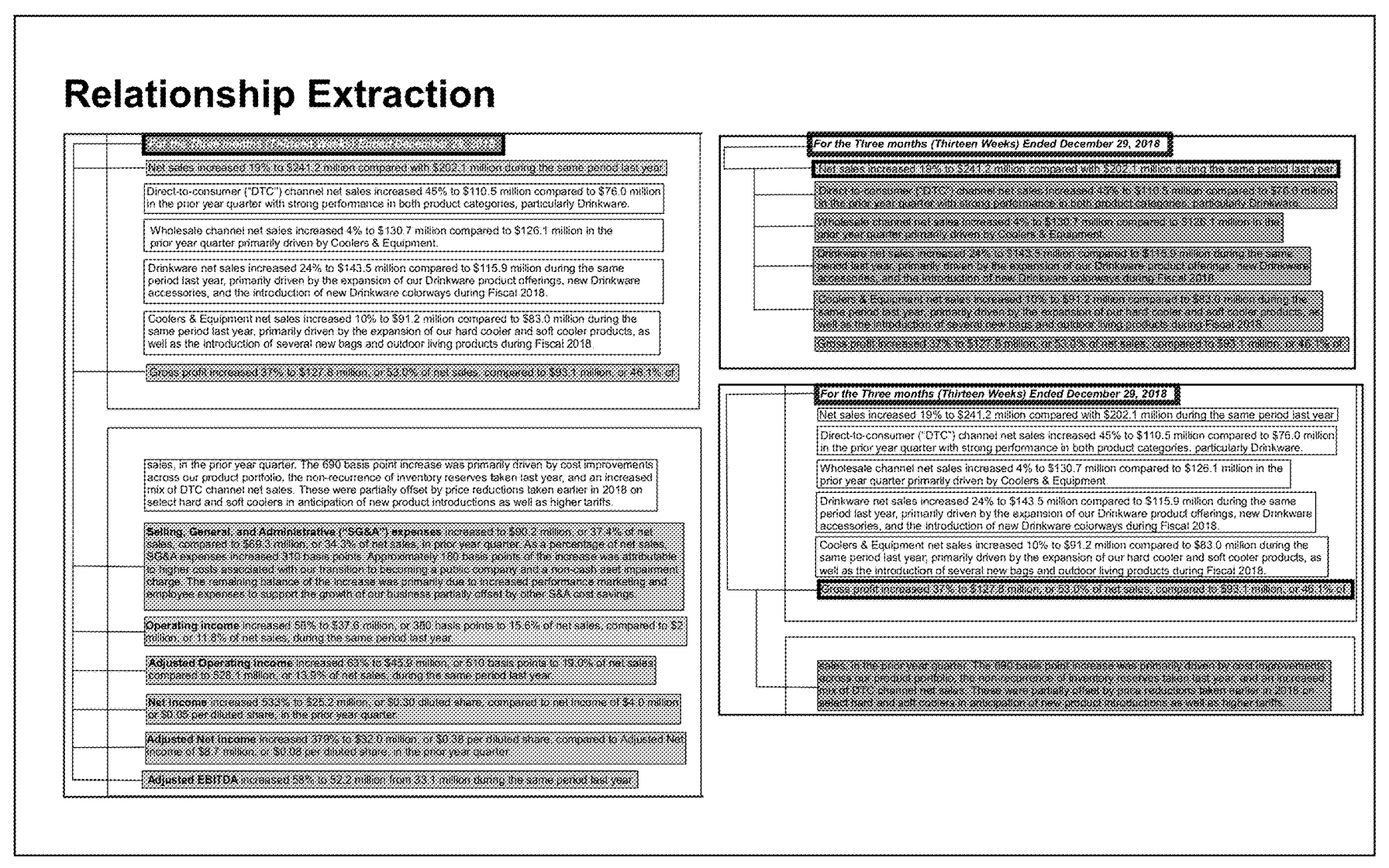

As illustrated in FIG. 8, embodiments of this presentation can display a plurality of written documents, or multiple pages of a written documents, simultaneously. In the left portion of FIG. 8, a top boundary marker is selected and interface 38 highlights the 8 paragraphs of the displayed written document that are hierarchically linked to the selected boundary marker with the highest hierarchical level below the hierarchical level of the selected boundary marker. The outlines of the selected boundary marker are thickened and the selected boundary marker is filled with the transparent color of its label. The highlighted boundary markers of lower hierarchical level are only filled out with the transparent color of their label. According to embodiments of this presentation, the different hierarchical levels can be defined by the order of the list of labels displayed by interface 38. For example, "Document title" can be the label of highest hierarchical value, followed by "Page header", then "Header", "Inline header", "Content", "table", "Form", Image", etc. . . . . Alternative hierarchical level orders can also be used.

In the top right portion of FIG. 8, the second top boundary marker is selected, its outlines are thickened and it is filled with the transparent color of its label. The top boundary marker is hierarchically linked to the selected boundary marker, and has a higher hierarchical level. Accordingly, interface 38 thickens the outlines of the top boundary marker. Four lower boundary markers are hierarchically linked to the selected boundary marker, and have a lower hierarchical level. Accordingly, interface 38 fills these boundary markers with the transparent color of their label.

In the lower right portion of FIG. 8, the sixth top boundary marker is selected, its outlines are thickened and it is filled with the transparent color of its label. The top boundary marker is hierarchically linked to the selected boundary marker, and has a higher hierarchical level. Interface 38 thickens the outlines of the top boundary marker. The lower boundary marker is hierarchically linked to the selected boundary marker, and has a lower hierarchical level. Interface 38 fills this boundary markers with the transparent color of its label.

According to embodiments of this presentation and as illustrated in FIGS. 7 and 8 interface 38 can displays each link between two boundary markers as series of lines comprising a vertical line, as detailed above in relation with FIGS. 2B and 2C.

Figure 9:
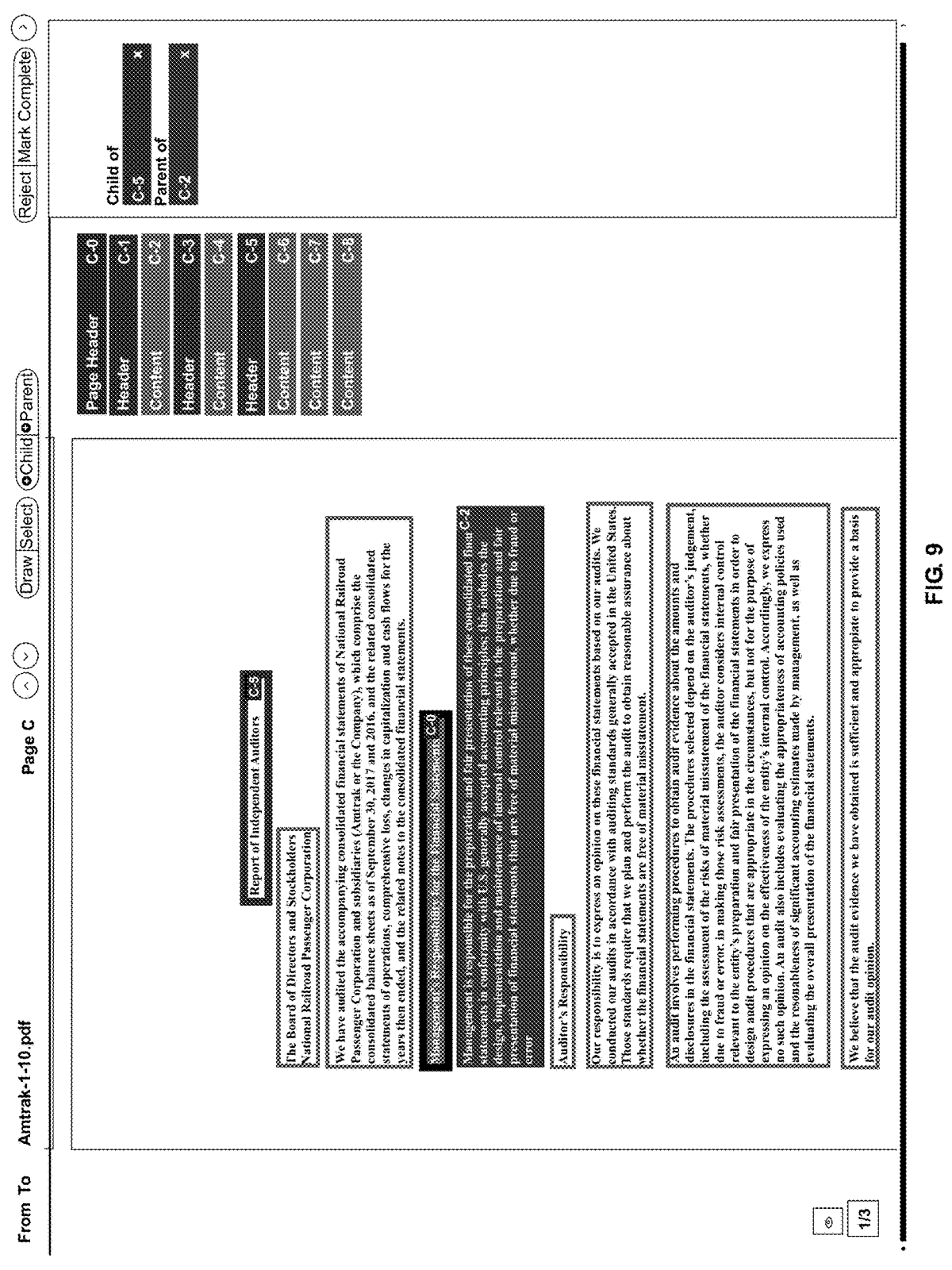

FIG. 9 is a partial reproduction of a display of a GUI such as shown in FIGS. 2A to 2C.

FIG. 10 illustrates an embodiment of this presentation where the written document comprises a table having rows and columns. In the top portion of FIG. 10, a title of a row is selected and interface 38 indicates so by thickening the outline of the boundary marker around the title and filling the boundary marker with the color of its label. Further, interface 38 indicates that each data of the row has a hierarchical level immediately below the hierarchical level of the title of the row, by filling with their labels color the boundary markers around each data of the row. Consistently, interface 38 indicates that the title of the table ("revenue") has a hierarchical level immediately above the hierarchical level of the title of the row, by thickening the outline of the boundary marker around the title of the table.

In the bottom portion of FIG. 10, the boundary marker of an entry data of a row is selected and interface 38 indicates so by thickening the outline of the boundary marker around the title and filling the boundary marker with the color of its label. Further, interface 38 indicates that titles of the row and column where the entry data is located both have a hierarchical level immediately above the hierarchical level of the entry data, by thickening the outline of the boundary marker around the title of the table.

According to embodiments of this presentation, once model 30 has been properly trained—when user 20 can decide that the boundary boxes, hierarchical links and/or hierarchical labels extracted by model 30 and displayed by processor 28 are acceptable to user 20—system 10 can output a processed version of any input written document that lays out in any predetermined manner the hierarchical levels of all the hierarchical groups of the text data of the written document. FIG. 11 illustrates an exemplary output of system 10 according to embodiments of this presentation, which details the hierarchical levels of all of the hierarchical groups of the text data of a written document using predetermined indentation rule and numbering of paragraphs. It is noted that the output documents of system 10 contain in digitized form the hierarchical data extracted by model 30. In other words, once model 30 is trained, system 10 can be used to produce a vast amount of data, for example to form a training dataset for use in training a machine learning system to parse written documents in a way that pays attention to the hierarchical data of the written documents.

It is noted that embodiments of this presentation also comprise a system 10 as detailed above but arranged for being trained using documents where boundary markers have already been created.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this presentation with respect to the current state of the art, but also contemplates advancements and that adaptations in the future may take into consideration of those advancements, namely in accordance with the then current state of the art. Reference to a feature element in the singular is not intended to mean "one and only one" unless explicitly so stated. Moreover, no element, component, nor method or process step in this presentation is intended to be dedicated to the public regardless of whether the element, component, or step is explicitly recited in this presentation. No element disclosed herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A Graphical User Interface (GUI) system comprising:
an input arranged for receiving a plurality of first input documents, each first input document comprising first text data as well as first graphical data indicative of a first portion of the first text data and a second portion of the first text data forming different hierarchical groups within said first text data, wherein textual information present in said first and second portions of the first text data forms a hierarchical link between said first and second portions of the first text data;
a display arranged for displaying each of said first input documents to a user;
a first user interface arranged for allowing said user to add, in superposition with each displayed first input document, a boundary marker provided for visually bounding at least one of said first and second portions of said first text data; and
a processor arranged for, using the boundary markers added to the displayed first input documents, training a layout and text data analysis model to determine, in a second input document having second text data and second graphical data, if a first portion of said second text data and a second portion of said second text data form different hierarchical groups and, if so, if textual information present in said first and second portions of the second text data forms a hierarchical link between said first and second portions of the second text data, and, if so to display automatically in superposition with said second input document a boundary marker visually bounding at least one of said first and second portions of said second text data;
wherein the first user interface is further provided to allow said user to correct the boundary markers displayed by the layout analysis model on said second input document;
the processor being further arranged for training said layout and text data analysis model using the boundary markers corrected by the user and said second input document.

2. The GUI system of claim 1, further comprising a second user interface arranged for allowing said user to create a hierarchical link between any two displayed boundary markers, said hierarchical link comprising information about relative hierarchical levels the two linked boundary markers; the second user interface being further arranged for visually illustrating the hierarchical links;
the processor being further arranged for, using the hierarchical links created between the displayed boundary markers, training said layout and text data analysis model to determine if a hierarchical link exists in said second input document having second text data between boundary markers visually bounding said first and second portions of said second text data; and, if so, to display automatically any hierarchical link existing between displayed boundary markers;
wherein the second user interface is further provided to allow said user to correct the hierarchical links displayed by the layout and text data analysis model on said second input document;
the processor being further arranged for training said layout and text data analysis model using the hierarchical links corrected by the user and said second input document.

3. The GUI system of claim 2, wherein said visually illustrating the hierarchical links comprises joining a selected boundary marker to each hierarchically linked boundary marker by a line having a vertical segment of first horizontal position if the hierarchical link to the selected boundary marker is ascending and having a vertical segment of second horizontal position if the hierarchical link to the selected boundary marker is descending.

4. The GUI system of claim 2 further comprising a third user interface arranged for allowing said user to associate a hierarchical label to each displayed boundary marker; the third user interface being further arranged for visually illustrating the hierarchical label of each displayed boundary marker;
the processor being further arranged for, using the hierarchical labels associated to the displayed boundary markers, training said layout and text data analysis model to determine if said first and second portions of said second text data can be associated to any of said hierarchical labels; and, if so, to display automatically the hierarchical labels associated to the displayed boundary markers;
wherein the third user interface is further provided to allow said user to correct the hierarchical labels associated by the layout analysis model to said first and second portions of said second text data;
the processor being further arranged for training said layout and text data analysis model using the hierarchical labels corrected by the user and said second input documents.

5. The GUI system of claim 4, wherein said visually illustrating the hierarchical label of each displayed boundary marker comprises coloring the outlines of each displayed boundary marker in a color associated to the hierarchical label of said displayed boundary marker.

6. A Graphical User Interface (GUI) system comprising:
an input arranged for receiving a plurality of first input documents, each first input document comprising first text data as well as first graphical data indicative of a first portion of the first text data and a second portion of the first text data forming different hierarchical groups within said first text data;
a display arranged for displaying each of said first input documents to a user;
a first user interface arranged for allowing said user to add, in superposition with each displayed first input document, a boundary marker provided for visually bounding at least one of said first and second portions of said first text data; and
a processor arranged for, using the boundary markers added to the displayed first input documents, training a layout data analysis model to determine, in a second input document having second text data, if a first portion of said second text data and a second portion of said second text data form different hierarchical groups and, if so, to display automatically in superposition with said second input document a boundary marker visually bounding at least one of said first and second portions of said second text data;
wherein the first user interface is further provided to allow said user to correct the boundary markers displayed by the layout analysis model on said second input document;
the processor being further arranged for training said layout data analysis model using the boundary markers corrected by the user and said second input document;

the GUI system further comprising a second user interface arranged for allowing said user to create a hierarchical link between any two displayed boundary markers, said hierarchical link comprising information about relative hierarchical levels of the two linked boundary markers; the second user interface being further arranged for visually illustrating the hierarchical links;

the processor being further arranged for, using the hierarchical links created between the displayed boundary markers, training said layout data analysis model to determine if a hierarchical link exists in said second input document having second text data between boundary markers visually bounding said first and second portions of said second text data; and, if so, to display automatically any hierarchical link existing between displayed boundary markers;

wherein the second user interface is further provided to allow said user to correct the hierarchical links displayed by the layout analysis model on said second input document;

the processor being further arranged for training said layout data analysis model using the hierarchical links corrected by the user and said second input document;

wherein said visually illustrating the hierarchical links comprises making a first change and a second change to a selected displayed boundary marker; making said first change to each hierarchically linked boundary marker having a hierarchical level higher than the selected boundary marker and making said second change to each hierarchically linked boundary marker having a hierarchical level lower than the selected boundary marker.

7. The GUI system of claim 6, wherein each boundary markers comprises a line circumscribing the text data portion it visually bounds; wherein said first change comprises displaying the boundary marker line thicker and wherein said second change comprises filling said boundary marker with a transparent color.

8. The GUI system of claim 6, wherein said hierarchically linked boundary marker having a hierarchical level higher than the selected boundary marker only comprise hierarchically linked boundary markers having the lowest hierarchical level above the hierarchical level of said selected boundary marker; and said hierarchically linked boundary marker having a hierarchical level lower than the selected boundary marker only comprise hierarchically linked boundary markers having the highest hierarchical level below the hierarchical level of said selected boundary marker.

9. A Graphical User Interface (GUI) system comprising:
an input interface arranged for receiving a plurality of first input documents, each first input document comprising:
first text data as well as first graphical data indicative of a first portion of the first text data and a second portion of the first text data forming different hierarchical groups within said first text data, wherein textual information present in said first and second portions of the first text data forms a hierarchical link between said first and second portions of the first text data;
a boundary marker visually bounding each of said first and second portions of said first text data;
a display arranged to display to a user each first input document with said boundary markers in superposition;
a first user interface arranged for allowing said user to create and display a hierarchical link between the displayed boundary markers, said hierarchical link comprising information about relative hierarchical levels of the two linked boundary markers; and a processor arranged for, using the hierarchical links and the first input documents:
training a layout and text data analysis model to determine, in a second input document having second text data and second graphical data, if a first portion of said second text data and a second portion of said second text data form different hierarchical groups and, if so, if textual information present in said first and second portions of the second text data forms a hierarchical link between said first and second portions of the second text data, and, if so,
training said layout and text data analysis model to further determine what hierarchical link exists between said first and second portions of the second text data;
the first user interface being arranged to display automatically in superposition with said second input document a boundary marker visually bounding said first and second portions of said second text data as well as the hierarchical link determined by the layout and text data analysis model;
wherein the first user interface is further provided to allow said user to correct the boundary markers or the hierarchical link automatically displayed by the layout analysis model on said second input document;
the processor being further arranged for training said layout and text data analysis model using any boundary marker or hierarchical link corrected by the user and said second input document.

10. The GUI system of claim 9, wherein said visually illustrating the hierarchical links comprises joining a selected boundary marker to each hierarchically linked boundary marker by a line having a vertical segment of first horizontal position if the hierarchical link to the selected boundary marker is ascending and having a vertical segment of second horizontal position if the hierarchical link to the selected boundary marker is descending.

11. The GUI system of claim 9, further comprising a second user interface arranged for allowing said user to associate a hierarchical label to each displayed boundary marker;
the second user interface being further arranged for visually illustrating the hierarchical label of each displayed boundary marker;
the processor being further arranged for, using the hierarchical labels associated to the displayed boundary markers, training said layout and text data analysis model to determine if said first and second portions of said second text data can be associated to any of said hierarchical labels; and, if so, to display automatically the hierarchical labels associated to the displayed boundary markers;
wherein the second user interface is further provided to allow said user to correct the hierarchical labels associated by the layout analysis model to said first and second portions of said second text data;
the processor being further arranged for training said layout and text data analysis model using the hierarchical labels corrected by the user and said second input documents.

12. The GUI system of claim 11, wherein said visually illustrating the hierarchical label of each displayed boundary marker comprises coloring the outlines of each displayed boundary marker in a color associated to the hierarchical label of said displayed boundary marker.

13. A Graphical User Interface (GUI) system comprising:
an input interface arranged for receiving a plurality of first input documents, each first input document comprising:

first text data as well as first graphical data indicative of a first portion of the first text data and a second portion of the first text data forming different hierarchical groups within said first text data;

a boundary marker visually bounding each of said first and second portions of said first text data;

a display arranged to display to a user each first input document with said boundary markers in superposition;

a first user interface arranged for allowing said user to create and display a hierarchical link between the displayed boundary markers, said hierarchical link comprising information about relative hierarchical levels of the two linked boundary markers; and a processor arranged for, using the hierarchical links and the first input documents:

training a layout data analysis model to determine, in a second input document having second text data, if a first portion of said second text data and a second portion of said second text data form different hierarchical groups and, if so, training said layout data analysis model to further determine what hierarchical link exists between said first and second portions of the second text data;

the first user interface being arranged to display automatically in superposition with said second input document a boundary marker visually bounding said first and second portions of said second text data as well as the hierarchical link determined by the layout data analysis model;

wherein the first user interface is further provided to allow said user to correct the boundary markers or the hierarchical link automatically displayed by the layout analysis model on said second input document;

the processor being further arranged for training said layout data analysis model using any boundary marker or hierarchical link corrected by the user and said second input document;

wherein said visually illustrating the hierarchical links comprises making a first change and a second change to a selected displayed boundary marker; making said first change to each hierarchically linked boundary marker having a hierarchical level higher than the selected boundary marker and making said second change to each hierarchically linked boundary marker having a hierarchical level lower than the selected boundary marker.

14. The GUI system of claim 13, wherein each boundary markers comprises a line circumscribing the text data portion it visually bounds; wherein said first change comprises displaying the boundary marker line thicker and wherein said second change comprises filling said boundary marker with a transparent color.

15. The GUI system of claim 13, wherein said hierarchically linked boundary marker having a hierarchical level higher than the selected boundary marker only comprise hierarchically linked boundary markers having the lowest hierarchical level above the hierarchical level of said selected boundary marker; and said hierarchically linked boundary marker having a hierarchical level lower than the selected boundary marker only comprise hierarchically linked boundary markers having the highest hierarchical level below the hierarchical level of said selected boundary marker.

\* \* \* \* \*